US012603903B2

(12) United States Patent
Marbouti et al.

(10) Patent No.: US 12,603,903 B2
(45) Date of Patent: *Apr. 14, 2026

(54) METHODS AND SYSTEMS FOR CYBER THREAT DETECTION USING ARTIFICIAL INTELLIGENCE MODELS IN DATA-SPARSE ENVIRONMENTS

(71) Applicant: Capital One Services, LLC, McLean, VA (US)

(72) Inventors: Farshid Marbouti, San Jose, CA (US); Gurpreet Singh Sandhu, Walnut Creek, CA (US); Sarvani Kare, Clarksville, MD (US); Nahid Farhady Ghalaty, Fairfax, VA (US); Daniel Liu, Palo Alto, CA (US); Patrick Sofo, Arlington, VA (US); Lee Adcock, Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/830,352

(22) Filed: Sep. 10, 2024

(65) Prior Publication Data

US 2024/0430277 A1     Dec. 26, 2024

Related U.S. Application Data

(63) Continuation of application No. 17/811,551, filed on Jul. 8, 2022, now Pat. No. 12,088,605.

(51) Int. Cl.
*G06F 21/50* (2013.01)
*G06F 40/30* (2020.01)
*H04L 9/40* (2022.01)
*H04L 41/16* (2022.01)

(52) U.S. Cl.
CPC .......... *H04L 63/1416* (2013.01); *G06F 40/30* (2020.01); *H04L 41/16* (2013.01)

(58) Field of Classification Search
CPC ...... H04L 63/1416; H04L 41/16; G06F 40/30
See application file for complete search history.

(56) References Cited

U.S. PATENT DOCUMENTS 11,729,196 B2 * 8/2023 Ciocarlie ............ H04L 63/1433
                                                      726/25
2020/0225655 A1 * 7/2020 Cella ................ G05B 19/41865

* cited by examiner

*Primary Examiner* — Normin Abedin
(74) *Attorney, Agent, or Firm* — Foley & Lardner LLP

(57) ABSTRACT

Methods and systems comprising a first portion of a model that includes a model component that is trained to perform sentiment analysis based on training data for a plurality of users (e.g., what language, phrases, and/or responses the population at large uses). The first portion of the model also includes a model component that is trained to identify user intent based on the sentiment analysis that is specific to user groups. For example, the system first determines the likely context and/or meaning of communications of the user. The system then determines a likely intent of the user based on the likely context and/or meaning of communications (e.g., based on a correlation of the meaning of communications of the user and the intents of users corresponding to a user group of the user).

20 Claims, 5 Drawing Sheets

100

300

302

304

Standard BERT Model
(Trained on Google Data)

Fine-tuned BERT Model

308

Ensemble Prediction
(Bagging/Stacking)

Final Classification

306

Pageview Pages

Text Path/Page
Structures

500

Receive user profile data

502

Input the user profile data into a first model component

504

Receive user interaction data

506

Input the user interaction data into a second model component

508

Receive outputs

510

Generate a cyber incident response based on the outputs

512

METHODS AND SYSTEMS FOR CYBER THREAT DETECTION USING ARTIFICIAL INTELLIGENCE MODELS IN DATA-SPARSE ENVIRONMENTS

CROSS-REFERENCE TO RELATED PATENT APPLICATIONS

This application is a Continuation of U.S. patent application Ser. No. 17/811,551, filed Jul. 8, 2022, which is incorporated herein by reference in its entirety.

BACKGROUND

In recent years, the use of artificial intelligence, including, but not limited to, machine learning, deep learning, etc. (referred to collectively herein as artificial intelligence) has exponentially increased. Broadly described, artificial intelligence refers to a wide-ranging branch of computer science concerned with building smart machines capable of performing tasks that typically require human intelligence. Key benefits of artificial intelligence are its ability to process data, find underlying patterns, and/or perform real-time determinations. However, despite these benefits and despite the wide-ranging number of potential applications, practical implementations of artificial intelligence have been hindered by several technical problems. First, artificial intelligence often relies on large amounts of high-quality data. The process for obtaining this data and ensuring it is high-quality is often complex and time-consuming. Second, despite the mainstream popularity of artificial intelligence, practical implementations of artificial intelligence require specialized knowledge to design, program, and integrate artificial intelligence-based solutions, which limits the amount of people and resources available to create these practical implementations. Finally, results based on artificial intelligence are notoriously difficult to review as the process by which the results are made may be unknown or obscured. This obscurity creates hurdles for identifying errors in the results, as well as improving the models providing the results.

These technical problems present an inherent problem with attempting to use an artificial intelligence-based solution in data processing load predictions.

In view of the aforementioned problems, methods and systems are described herein for novel uses and/or improvements to the detection of cyber incidents and workplace violence with a cyber aspect. For example, users (e.g., employees, consultants, etc.) within a system may cause damage to a system through several vectors, including data exfiltration, theft of physical and intellectual property, information technology (IT) sabotage, fraud, espionage, and through workplace violence. Workplace violence may involve physical violence or the threat of physical violence, which may include physical attacks, threats directed at a person or entity (whether spoken, written, or electronically transmitted), intimidating or threatening behavior, harassment, coercion, and/or other behavior or comments that attempt to harm or give reasonable cause to believe it places users at risk. Furthermore, as work is increasingly moved online and user interactions increasingly occur, if not solely occur, through electronic communications, the amount of cyber incidents and workplace violence with a cyber incident (collectively referred to herein as "cyber incidents") will increase.

The detection of cyber incidents presents a unique challenge compared with the detection of other events because the detection of a cyber incident requires an immediate response. For example, if an incident of IT sabotage is detected or the likelihood of IT sabotage reaches a particular threshold, a system must take immediate action to prevent the IT sabotage. The lack of the immediate response may result in the IT sabotage happening, which may result in irrevocable downstream effects such as the loss of data, exposure of confidential information, and/or a breach in institutional trust. Similarly, if an incident of workplace violence is detected or the likelihood of workplace violence reaches a particular threshold, a system must take immediate action to prevent the workplace violence. Furthermore, the response for many incidents must be absolute and final. For example, in the case of workplace violence, data breaches, and/or data theft, a system may not have an opportunity to confirm that a given incident is imminent. That is, the system may need to react instantly with preventative measures (e.g., instituting computer lockouts, modifying access credentials, and/or alerting relevant authorities) as any delay may unduly raise risks.

At a threshold level, the use of artificial intelligence with its ability to make instantaneous determinations and take immediate responsive action may seem like a natural choice to apply to the detection of cyber incidents. However, the use of artificial intelligence for this application has a fundamental flaw that presents a unique technical challenge for the detection of cyber incidents; namely, artificial intelligence, whether based on machine learning, deep learning, etc., requires ample and high-quality training data to train a model to make accurate and precise determinations. Such training data does not exist for cyber incidents.

Conventional approaches to overcoming the technical problem of sparse, high-quality training data are not appropriate for the detection of cyber incidents. For example, a conventional approach to overcoming the technical problem of sparse, high-quality training data would entail manual creation of training data (e.g., manually created examples of language, phrases, and/or scenarios) that may be indicative of a cyber incident occurring (or imminently occurring). However, not only is such a solution time-consuming (e.g., each example of key language, phrase, and/or scenario must be individually identified, created, and programmed), but manually created training data is unlikely to be effective in real-world situations. For example, in many cases, indicia of a cyber incident occurring (or imminently occurring) is user-specific. That is, use of a particular phrase by one user may not reflect that same behavior or context in another user. Similarly, one user may not react the same way (or have the same intention) under the same scenario as another user.

To overcome this technical problem, the methods and systems propose a novel architecture for an artificial intelligence model. Specifically, the model bifurcates training of the model for the ultimate goal of cyber threat detection based on whether components for that ultimate goal may have adequate training data. For example, a first portion of the model includes a model component that is trained to perform sentiment analysis based on training data for a plurality of users (e.g., what language, phrases, and/or responses the population at large uses). The first portion of the model also includes a model component that is trained to identify user intent based on the sentiment analysis that is specific to user groups. For example, the system first determines the likely context and/or meaning of communications of the user. The system then determines a likely intent of the user based on the likely context and/or meaning of communications (e.g., based on a correlation of the meaning of communications of the user and the intents of users corresponding to a user group of the user).

Additionally, the model includes a second portion to compensate for the sparseness of training data for cyber threat detection. Notably, the second portion is not trained to determine whether or not a user has a specific intent (e.g., an intent to commit a cyber incident), but instead is trained to determine the amount of user engagement. For example, the second portion of the model generates a quantitative metric to define how engaged a user is compared to his/her own history. For example, the gradual decrease in the amount of engagement may indicate the increased likelihood of the user committing a cyber incident (e.g., indicate an intention to leave an organization, withdraw from peer groups, and commit a cyber incident on the way out). Notably, as the second portion of the model relies on quantitative metrics (e.g., a rate of change in engagement) as opposed to qualitative metrics (e.g., the likely context and/or meaning of communications of the user), and the second portion of the model relies only on inputs of the user's own behavior, less training data is required to create an accurate and precise model for the second portion.

Finally, by relying on both these unconventional inputs and architecture, the system overcomes the technical problem associated with the conventional solutions to training artificial intelligence models with sparse, high-quality training data. Furthermore, by generating/training the model portions in parallel and relying on outputs of the model portions to cyber threat detection occurring (or imminently occur), the system has overcome the technical problem of using artificial intelligence for the detection of cyber incidents.

In some aspects, systems and methods for cyber threat detection using artificial intelligence models in data-sparse environments are described. For example, the system may receive user profile data, wherein the user profile data comprises content generated by a user characteristic for the user. The system may generate, based on the user profile data, a first feature input. The system may input the first feature input into a first model component of an artificial intelligence model, wherein the first model component comprises a neural network that is trained to predict a plurality of user intents based on the user characteristic, and a respective probability for each of the plurality of user intents based on a semantic analysis of the content. The system may receive user interaction data, wherein the user interaction data comprises time series data indicating an interaction rate of the user with a user device as a function of time. The system may generate, based on the user interaction data, a second feature input. The system may input the second feature input into a second model component of the artificial intelligence model, wherein the second model component comprises a machine learning model that is trained to generate user engagement metrics for users based on interaction rates of users. The system may receive a first output from first model component. The system may receive a second output from second model component. The system may generate for display, in a user interface, a cyber incident response based on the first output and the second output.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an." and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
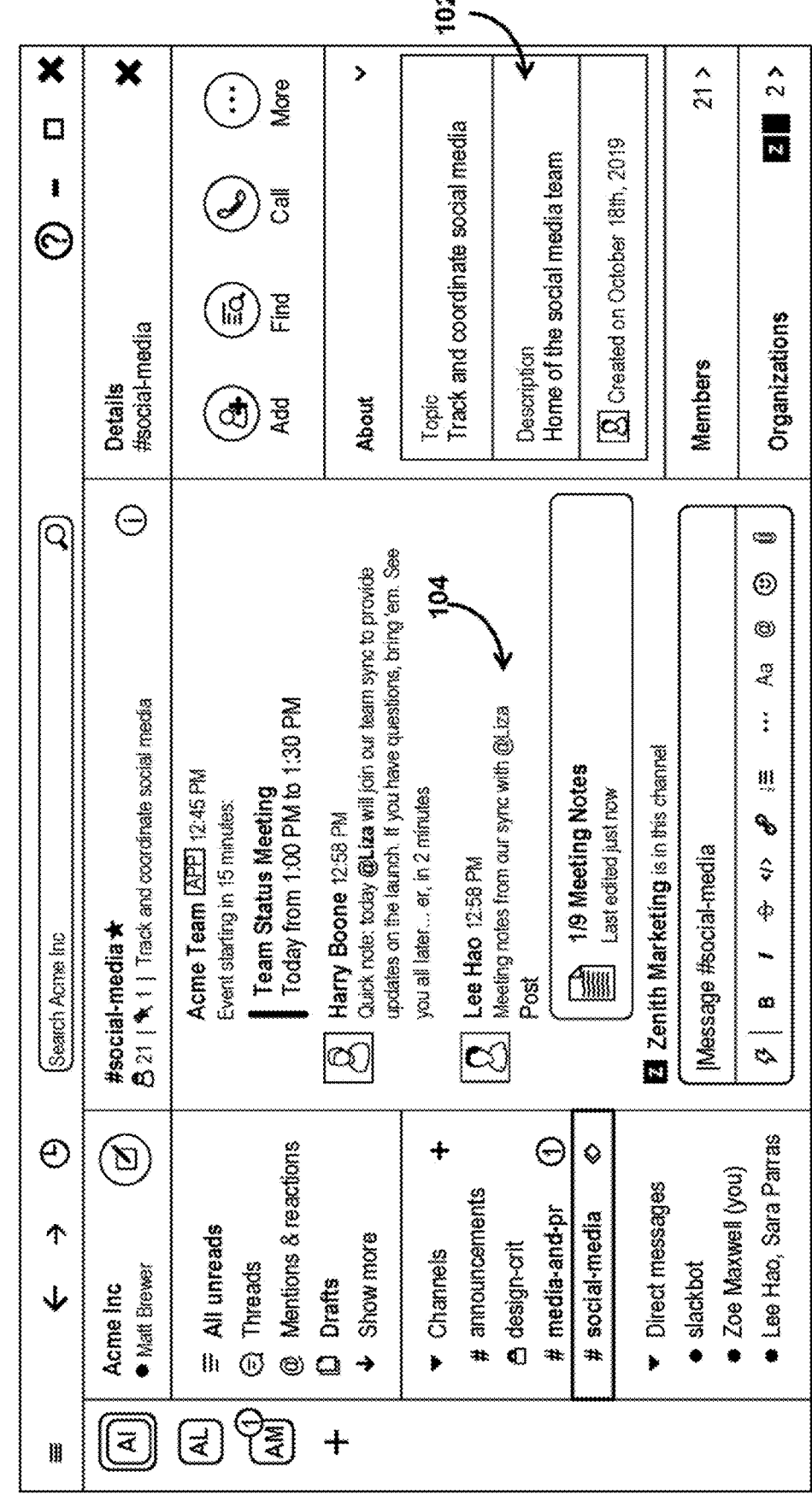
FIG. 1 shows an illustrative user interface for a user device that is used to gather user profile data and user interaction data for cyber threat detection, in accordance with one or more embodiments.

FIG. 1, shows an illustrative user interface for a user device that is used to gather user profile data and user interaction data for cyber threat detection, in accordance with one or more embodiments. For example, FIG. 1 shows a user interface featuring user generated content such as user generated communications (e.g., messages, posts, social media content, etc.).

As referred to herein, a "user interface" may comprise a human-computer interaction and communication in a device, and may include display screens, keyboards, a mouse, and the appearance of a desktop. For example, a user interface may comprise a way a user interacts with an application or a website. As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user.

The system may monitor content generated by the user to generate user profile data. For example, the user profile data may comprise content generated by the user and a user characteristic for the user. A user profile may be content consumed and/or created by a user. User profile data may also include a user characteristic. As referred to herein, "a user characteristic" may include about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring.

In some embodiments, the system may parse various sections of a user interface to determine the content of a user and/or whether a user interacted with (and/or a rate of interaction with) the content. As referred to herein, a "section" may comprise any of the more or less distinct parts into which something the content may be divided or from which the content is made up. For example, a section may be distinguished from another section by one or more section characteristics. In user interface 100, the system may identify a section of the plurality of sections as having a section characteristic.

A section characteristic may comprise any characteristic that distinguishes one section from another. For example, a section characteristic may be media-related information (e.g., ordering, heading information, titles, descriptions), ratings information (e.g., parental control ratings, critic's ratings, etc.), source code data (e.g., HTML, source code headers, etc.), genre or category information, subject matter information, author/actor information, logo data, or other identifiers for the content provider, media format, file type, object type, objects appearing in the content (e.g., product placements, advertisements, keywords, context), or any other suitable information used to distinguish one section from another. In some embodiments, the section characteristic may also be human-readable text. The section characteristic may be determined to be indicative of the section being of interest to the user based on a comparison of the section characteristic and user profile data for the user.

For example, user interface 100 may include section 102. The system may identify section 102 based on a paragraph, section break, and/or an HTML tag. The system may parse the section for a content characteristic and metadata describing the content characteristic, wherein the metadata indicates a context of the content characteristic, and wherein the content characteristic comprises human-readable text. For example, as shown in user interface 100, the system may identify content characteristic 104. As referred to herein, a "content characteristic" may comprise any of the more or less distinct parts into which the section may be divided or from which the section is made up. For example, a content characteristic may be anything that may distinguish one content characteristic from another. In some embodiments, content characteristic may be human-readable text. For example, the content characteristic may be a word, phrase, language, image, embedded object, etc.

The system may generate a content map for the section based on the parsing, wherein the content map indicates a position of the content characteristic in the section. For example, the content map may include each content characteristic of a given section with the distances and/or positions indicated. For example, the system may determine a CSS ("Cascading Style Sheets") position property for each characteristic. In another example, the system may use HTML absolute positioning to define a content map. The system may then generate a feature input based on the content map and a content characteristic, wherein the feature input comprises a vector array of values indicative of the content map and the content characteristic.

Figure 2:
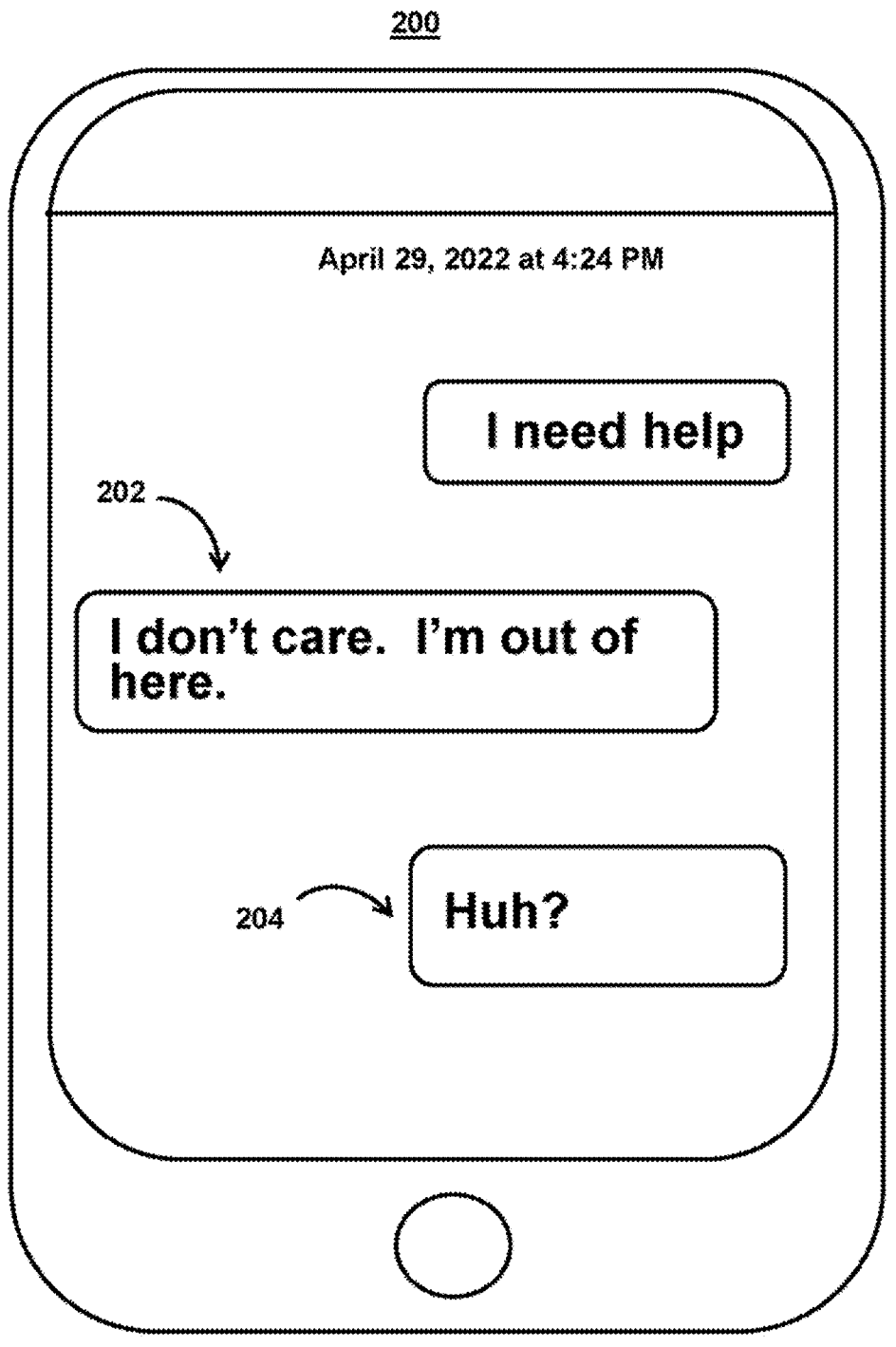
FIG. 2 shows another illustrative user interface for another user device that is used to gather user profile data and user interaction data for cyber threat detection, in accordance with one or more embodiments.

FIG. 2 shows another illustrative user interface for another user device that is used to gather user profile data and user interaction data for cyber threat detection, in accordance with one or more embodiments. For example, as shown in FIG. 2, the system may identify a content characteristic (e.g., phrase 202). The system may perform a sentiment analysis on phrase 202 in order to determine a meaning, context, and/or user intent. For example, the system may use natural language processing, text analysis, computational linguistics, and biometrics to systematically identify, extract, quantify, and study affective states and subjective information.

In some embodiments, the system may continually determine a likely intent of the user in order to generate cyber incident responses (e.g., in the form of prompts, notifications, and/or other communications). For example, the system may aggregate user interaction data. As referred to herein, "user interaction data" may include any step or action (or inaction) taken by a user, including computer processes, which may or may not be perceivable to a user, that are based on user interactions with one or more devices. In some embodiments, user interaction data may include insights about users, provided to the application (e.g., via an API) from one or more sources such as a qualitative or quantitative representation (e.g., a percent) of a given activity (e.g., online spending) in a given time period (e.g., six months), upcoming actions (e.g., travel departure, pay day, leave, and/or family event) for a user, information about third parties, for example, merchants (ranked by the number of transactions) over the last year for the user, etc. For example, the system may determine a first number of user interactions over a first time period and determine a second number of user interactions over a second time period. The system may then determine an interaction rate based on the first number and the second number. For example, the interaction rate may comprise a rate of interactions of the user with a user device as a function of time.

For example, in response to a user interaction, which in some embodiments may comprise a user logging onto an application that generates user interface 200, inputting a phrase (e.g., phrase 202) into user interface 200, and/or a prior action (or lack thereof) by a user to a prior response generated by the system (or another user), the system may take one or more steps to generate cyber incident responses. These steps may include retrieving data about the user, retrieving data from other sources, monitoring user actions, and/or other steps in order to generate a feature input (e.g., as discussed below).

In some embodiments, the feature input may include a vector that describes various information about a user, a user action (which may include user inactions), and/or a current or previous interaction by the user with a user device. For example, a feature input may include a vector of values generated based on user profile data and/or a vector of values generated based on user interaction data. The system may further select the information for inclusion in the feature input based on a predictive value. The information may be collected actively or passively by the system and compiled into a user profile.

In some embodiments, the feature input may reflect user profile data, such as conversation details and information about a current session, including a channel or platform, for example, desktop web, iOS, mobile, launch page (e.g., the webpage that the application was launched from), a time of launch, and/or activities in a current or previous session before launching the application. The system may store this information and all the data about a conversational interaction may be available in real-time via HTTP messages and/or through data streaming from one or more sources (e.g., via an API.).

In some embodiments, the user profile data may include user account information such as types of accounts the user has, other accounts on file (e.g., bank accounts for payment), and information associated with accounts (e.g., credit limit, current balance, due date, recent payments, recent transactions, etc.). The system may obtain this data in real-time for model prediction through enterprise APIs.

Figure 3:
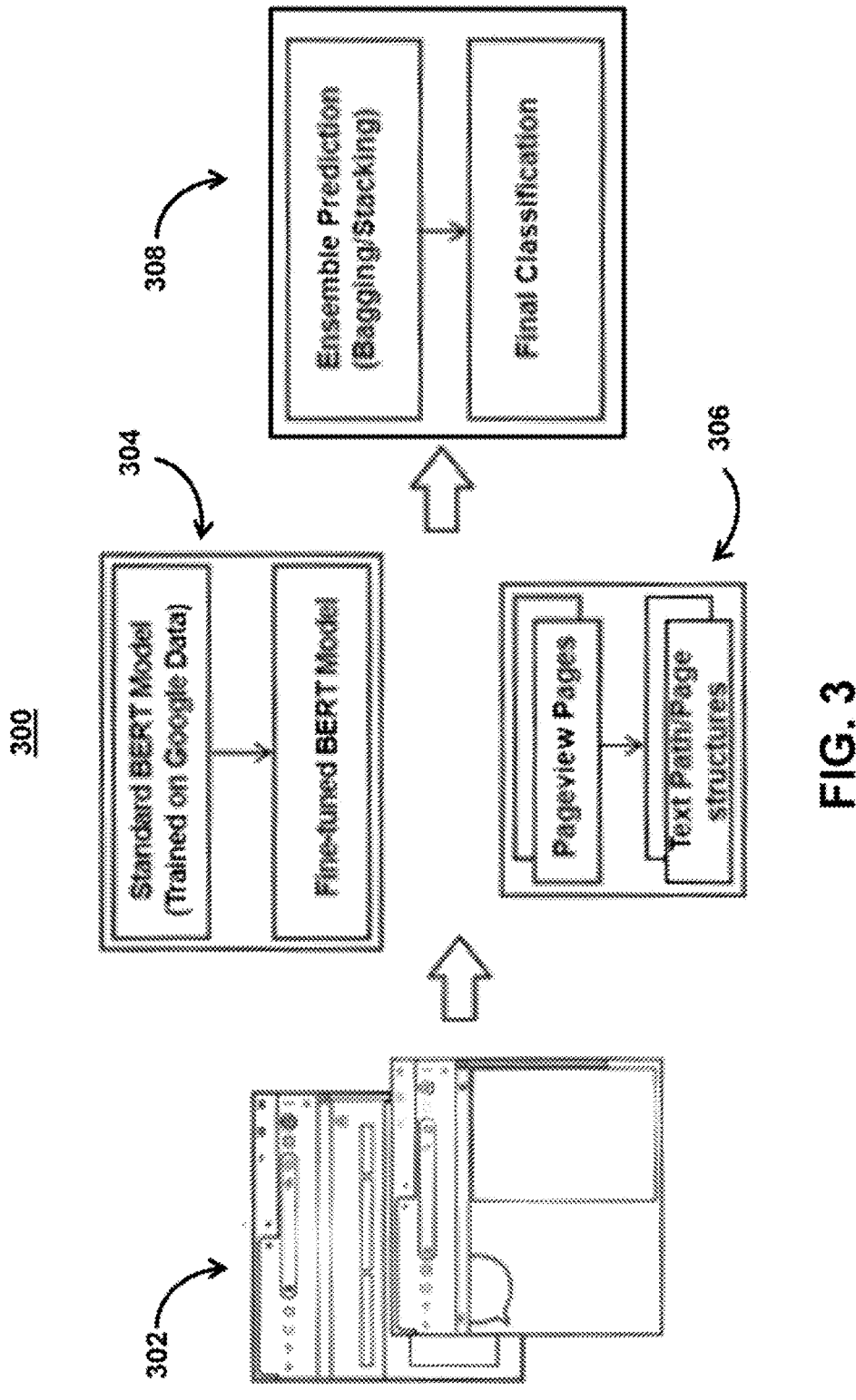
FIG. 3 is an illustrative system for cyber threat detection, in accordance with one or more embodiments.

FIG. 3 is an illustrative system for cyber threat detection, in accordance with one or more embodiments. System 300 may receive user profile data and/or user interaction data based on user inputs with user interfaces (e.g., user interface 100 (FIG. 1)) during a device session. The user profile data and/or user interaction data may also include metadata, which may be metadata related to user interfaces (e.g., user interface 100 (FIG. 1)). Metadata may include pageview information and text path and page structure data. For example, a pageview (or pageview hit, page tracking hit) may be an instance of a page being loaded (or reloaded) in a browser. Text path information may indicate line, shapes, and/or graphic elements that text follows. Metadata may also include information on how the application and/or the website is set up (i.e., how the individual subpages are linked to one another).

In some embodiments, the system may generate user profile data and/or user interaction data using image recognition and/or object recognition. For example, the system may determine a first user interface image corresponding to the first user action in the user interface. For example, the system may capture user interface image data such as an image of a current user interface and/or menus or features being accessed. The system may then apply computer vision techniques to determine metadata or a vector array corresponding to the image. For example, the system may employ computer vision tasks that include acquiring, processing, analyzing, and understanding digital images, and extraction of high-dimensional data from the real world in order to produce numerical or symbolic information (e.g., in the forms of decisions).

System 300 may process user interface 302. For example, the system may receive user profile data, wherein the user profile data comprises content generated by the user and a user characteristic for the user. The system may then generate, based on the user profile data, a first feature input. The system may then input the first feature input into a first model component (e.g., model component 304) of an artificial intelligence model, wherein the first model component comprises a neural network that is trained to predict a plurality of user intents based on the user characteristic, and a respective probability for each of the plurality of user intents based on a semantic analysis of the content.

System 300 (e.g., via a first model component) may perform a semantic analysis of user profile data. For example, system 300 may also receive information, which may use a Bidirectional Encoder Representations from Transformers (BERT) language model for performing natural language processing. For example, the BERT model includes pre-training contextual representations, including Semi-Supervised Sequence Learning, Generative Pre-Training, Embeddings from Language Models (ELMo), and Universal Language Model Fine-Tuning (ULMFit). Unlike previous models, BERT is a deeply bidirectional, unsupervised language representation, pre-trained using only a plain text corpus. Context-free models such as word2vec or GloVe generate a single word embedding representation for each word in the vocabulary, whereas BERT takes into account the context for each occurrence of a given word. For instance, whereas the vector for "running" will have the same word2vec vector representation for both of its occurrences in the sentences "He is running a company" and "He is running a marathon," BERT will provide a contextualized embedding that will be different according to the sentence. Accordingly, the system is better able to determine an intent of the user.

In some embodiments, the system may additionally or alternatively, use ELMo. For example, ELMo is a deep contextualized word representation that models both (1) complex characteristics of word use (e.g., syntax and semantics), and (2) how these uses vary across linguistic contexts (i.e., to model polysemy). These word vectors may be learned functions of the internal states of a deep bidirectional language model (biLM), which may be pre-trained on a large text corpus. ELMOs may be easily added to existing models and significantly improve the state of the art across a broad range of challenging natural language processing problems, including question answering, textual entailment, and sentiment analysis.

In some embodiments, the system may additionally or alternatively, use ULMFiT. ULMFiT is a transfer learning technique for use in natural language processing problems, including question answering, textual entailment, and sentiment analysis. ULMFiT may use a long short-term memory (LSTM) in an artificial recurrent neural network (RNN) architecture. The LSTM may include a three-layer architecture that includes: general domain language model pre-training; target task language model fine-tuning; and target task classifier fine-tuning.

System 300 may also use transfer learning. For example, transfer learning allows system 300 to deal with current scenarios (e.g., detecting user intent) by leveraging the already existing labeled data of some related task or domain (e.g., user intents for a user group of the user). For example, the system may predict a plurality of user intents based on a user characteristic (e.g., a detected word) in user interface 302. The system may then use this information to determine a respective probability for each of the plurality of user intents based on a semantic analysis of the content.

The system may also determine a likely intent of the user based on the likely context and/or meaning of communications (e.g., based on a correlation of the meaning of communications of the user and the intents of users corresponding to a user group of the user). For example, system 300 may select the respective probability based on the intents of users corresponding to a user group of the user. System 300 may store knowledge gained through other tasks and apply it to the current task. For example, system 3M) may use transfer learning to re-fine information into fine-tuned BERT model information that is refined using internal data and/or data related to detecting user intent.

For example, the system may first determine the likely context and/or meaning of communications of the user. The system then determines a likely intent of the user based on the likely context and/or meaning of communications (e.g., based on a correlation of the meaning of communications of the user and the intents of users corresponding to a user group of the user).

System 300 may then proceed to process this information in first model component 304. First model component 304 may include a convolutional neural network (CNN) that includes an input layer and an output layer, as well as multiple hidden layers. The hidden layers of a CNN may include a series of convolutional layers that convolve with a multiplication or other dot product. First model component 304 may use an activation function in a RELU layer (and/or LeakyRELU layer), and may subsequently comprise additional convolutions such as pooling layers, fully connected layers, and normalization layers, referred to as hidden layers because their inputs and outputs are masked by the activation function and final convolution.

First model component 304 may also include a softmax function or a normalized exponential function. The softmax function takes as input a vector z of K real numbers and normalizes it into a probability distribution consisting of K probabilities proportional to the exponentials of the input numbers. That is, prior to applying softmax, some vector components could be negative, or greater than one; and might not sum to 1; but after applying softmax, each component will be in the interval (0,1), and the components will add up to 1, so that they can be interpreted as probabilities. Furthermore, the larger input components will correspond to larger probabilities. For example, the first model component comprises a neural network that is trained to predict a plurality of user intents based on the user characteristic, and a respective probability for each of the plurality of user intents based on a semantic analysis of the content.

First model component 304 and second model component 306 may process, and be trained on, similar data. For example, each of first model component 304 and second model component 306 may receive an input of a feature input and generate an output. The architecture of first model component 304 and second model component 306 may be the same and/or may have one or more distinguishing elements. For example, second model component 306 may be trained using a multi-class cross entropy loss function, whereas first model component 304 may be trained using a binary cross entropy loss function. For example, cross entropy loss, or log loss, measures the performance of a classification model whose output is a probability value between 0 and 1. A multi-class cross entropy loss function results in a distribution of probabilities that sum to 1, whereas a binary cross entropy loss function results in a distribution of probabilities that may not sum to 1.

For example, a multi-class classification classifies instances into one of three or more classes, whereas classifying instances into one of two classes is called binary classification. Multi-class classification techniques can be categorized into (i) transformation to binary (ii) extension from binary and (iii) hierarchical classification. Furthermore, a one-vs, rest strategy involves training a single classifier per class, with the samples of that class as positive samples and all other samples as negatives. For example, the system may use base classifiers to produce a real-valued confidence score for its decision, rather than just a class label. For example, discrete class labels alone can lead to ambiguities, where multiple classes are predicted for a single sample.

Second model component 306 may perform a classification on the time-dependent user account information. For example, second model component 306 may comprise a machine learning model that is trained to generate user engagement metrics for users based on interaction rates of users. For example, the user engagement metric may comprise a quantitative metric indicating a rate at which a user's engagement has changed.

For example, the system may receive user interaction data in the form of metadata. Metadata may include pageview information and text path and page structure data. For example, a pageview (or pageview hit, page tracking hit) may be an instance of a page being loaded (or reloaded) in a browser. Text path information may indicate line, shapes, and/or graphic elements that text follows. The system may then generate a feature input based on this information.

For example, metadata may represent the user interaction data that is detected by the system prior to the system generating one or more cyber incident responses. For example, as discussed above in relation to FIG. 1 above, the system may retrieve data about current and/or previous user interactions with the application, webpage, or other feature. Additionally or alternatively, the system may retrieve other information (e.g., time-dependent user information and/or transaction data). For example, the system may determine a user engagement metric for the user based on interaction rates of the user over a given time period.

The system may then create a vector of data values that corresponds to the user interaction data. The system may represent this vector of data as a matrix and/or may perform matrix operations to pre-process this data. This pre-processing may include applying weights to individual values or representations of a collection of values (e.g., corresponding to a region or pageview) in the matrix, as well as identifying importance of given values (e.g., using pooling and/or attention layers).

First model component 304 and second model component 306 may receive inputs and generate outputs. This output may be processed by third model component 308. System 300 may further include an aggregation function that may average outputs from first model component 304 and second model component 306. For example, that system may determine a weight for an output from first model component 304 and/or second model component 306 is based on a weighted average, in which the weight is based on an amount of available data (e.g., the amount of content and/or the amount of length of a user interaction history). In some embodiments, the system may determine a weight based on a number of sub-components included within each of first model component 304 and second model component 306. For example, first model component 304 and second model component 306 may include sub-components that each generate an output. The system may determine the weight based on the number of these sub-components.

Third model component 308 may then generate a final classification. Third model component 308 may include ensemble prediction. For example, ensemble methods use multiple learning algorithms to obtain better predictive performance than could be obtained from any of the constituent learning algorithms alone. Unlike a statistical ensemble in statistical mechanics, which is usually infinite, a machine learning ensemble consists of only a concrete finite set of alternative models, but typically allows for a much more flexible structure to exist among those alternatives.

Additionally, third model component 308 may include bootstrap aggregating and stacking. For example, a first machine learning algorithm may determine whether a cyber incident probability (e.g., determined based on outputs of first model component 304 and second model component 306) corresponds to (e.g., equals or exceeds) a threshold cyber incident probability. A second machine learning algorithm may determine a type of cyber incident based on outputs of first model component 304 and second model component 306.

Bootstrap aggregating, often abbreviated as bagging, involves having each model in the ensemble vote with equal weight. In order to promote model variance, third model component 308 trains each model in the ensemble using a randomly drawn subset of the training set. As an example, the random forest algorithm combines random decision trees with bagging to achieve very high classification accuracy. In bagging, the samples are generated in such a way that the samples are different from each other, however, replacement is allowed. Stacking (sometimes called stacked generalization) involves training a learning algorithm to combine the predictions of several other learning algorithms. First, all of the other algorithms are trained using the available data, then a combiner algorithm is trained to make a final prediction using all the predictions of the other algorithms as additional inputs. If an arbitrary combiner algorithm is used, then stacking can theoretically represent any of the ensemble techniques described in this article, although, in practice, a logistic regression model is often used as the combiner. Stacking typically yields better performance than any single one of the trained models. It should be noted that in some embodiments first model component 302 and second model component 304 and/or additional models may be combined into one or more models (e.g., may comprise a single model).

Figure 4:
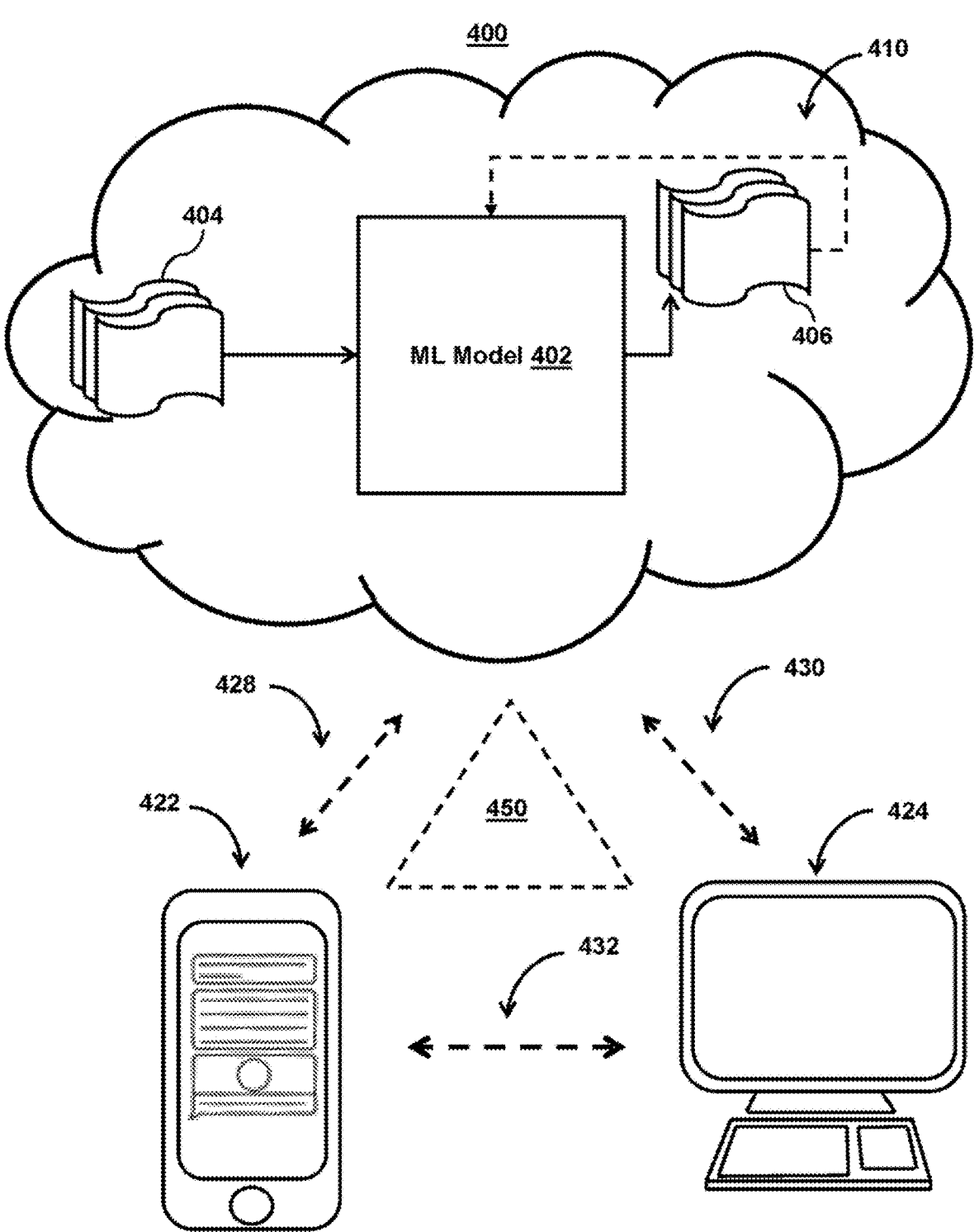
FIG. 4 is an illustrative architecture for an artificial intelligence model for cyber threat detection, in accordance with one or more embodiments.

FIG. 4 is an illustrative architecture for an artificial intelligence model for cyber threat detection, in accordance with one or more embodiments. As shown in FIG. 4, system 400 may include mobile device 422 and user terminal 424. While shown as a smartphone and personal computer, respectively, in FIG. 4, it should be noted that mobile device 422 and user terminal 424 may be any computing device, including, but not limited to, a laptop computer, a tablet computer, a hand-held computer, other computer equipment (e.g., a server), including "smart," wireless, wearable, and/or mobile devices. FIG. 4 also includes cloud components 410. Cloud components 410 may alternatively be any computing device as described above and may include any type of mobile terminal, fixed terminal, or other device. For example, cloud components 410 may be implemented as a cloud computing system and may feature one or more component devices. It should also be noted that system 400 is not limited to three devices. Users, may, for instance, utilize one or more devices to interact with one another, one or more servers, or other components of system 400. It should be noted, that, while one or more operations are described herein as being performed by particular components of system 400, those operations may, in some embodiments, be performed by other components of system 400. As an example, while one or more operations are described herein as being performed by components of mobile device 422, those operations, may, in some embodiments, be performed by components of cloud components 410. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components.

With respect to the components of mobile device 422, user terminal 424, and cloud components 410, each of these devices may receive content and data via input/output (I/O) paths.

Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 4, both mobile device 422 and user terminal 424 include a display upon which to display data (e.g., based on recommended contact strategies).

Additionally, as mobile device 422 and user terminal 424 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 400 may run an application (or another suitable program).

The application may cause the processors and/or control circuitry to perform operations related to generating dynamic database query responses using ensemble prediction by correlating probability models with non-homogenous time dependencies to generate time-specific data processing predictions.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resource (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the Internet, a mobile phone network, a mobile voice or data network (e.g., a 5G or LTE network), a cable network, a public switched telephone network, or other types of communications networks or combinations of communications networks. Communication paths 428, 430, and 432 may separately or together include one or more communications paths, such as a satellite path, a fiber-optic path, a cable path, a path that supports Internet communications (e.g., ITV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 410 may be a database configured to store user data for a user. For example, the database may include user data that the system has collected about the user through prior transactions. Alternatively, or additionally, the system may act as a clearinghouse for multiple sources of information about the user. Cloud components 410 may also include control circuitry configured to perform the various operations needed to generate recommendations.

Cloud components 410 includes artificial intelligence model 402. Artificial intelligence model 402 may take inputs 404 and provide outputs 406. The inputs may include multiple datasets, such as a training dataset and a test dataset. Each of the plurality of datasets (e.g., inputs 404) may include data subsets related to user data, contact strategies, and results. In some embodiments, outputs 406 may be fed back to artificial intelligence model 402 as input to train artificial intelligence model 402 (e.g., alone or in conjunction with user indications of the accuracy of outputs 406, labels associated with the inputs, or with other reference feedback information). For example, the system may receive a first labeled feature input, wherein the first labeled feature input is labeled with a known prediction for the first labeled feature input. The system may then train artificial intelligence model 402 to classify the first labeled feature input with the known prediction.

In another embodiment, artificial intelligence model 402 may update its configurations (e.g., weights, biases, or other parameters) based on the assessment of its prediction (e.g., outputs 406) and reference feedback information (e.g., user indication of accuracy, reference labels, or other information). In another embodiment, where artificial intelligence model 402 is a neural network, connection weights may be adjusted to reconcile differences between the neural network's prediction and the reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the artificial intelligence model 402 may be trained to generate better predictions.

In some embodiments, artificial intelligence model 402 may include an artificial neural network (e.g., as described in FIG. 4 below). In such embodiments, artificial intelligence model 402 may include an input layer and one or more hidden layers. Each neural unit of artificial intelligence model 402 may be connected with many other neural units of artificial intelligence model 402. Such connections can be enforcing or inhibitory in their effect on the activation state of connected neural units. In some embodiments, each individual neural unit may have a summation function that combines the values of all of its inputs together. In some embodiments, each connection (or the neural unit itself) may have a threshold function such that the signal must surpass before it propagates to other neural units. Artificial intelligence model 402 may be self-learning and trained, rather than explicitly programmed, and can perform significantly better in certain areas of problem solving, as compared to traditional computer programs. During training, an output layer of artificial intelligence model 402 may correspond to a classification of artificial intelligence model 402 and an input known to correspond to that classification may be input into an input layer of artificial intelligence model 402 during training. During testing, an input without a known classification may be input into the input layer, and a determined classification may be output.

In some embodiments, artificial intelligence model 402 may include multiple layers (e.g., where a signal path traverses from front layers to back layers). In some embodiments, back propagation techniques may be utilized by artificial intelligence model 402 where forward stimulation is used to reset weights on the "front" neural units. In some embodiments, stimulation and inhibition for artificial intelligence model 402 may be more free-flowing, with connections interacting in a more chaotic and complex fashion. During testing, an output layer of artificial intelligence model 402 may indicate whether or not a given input corresponds to a classification of artificial intelligence model 402.

System 400 also includes API layer 450. API layer 450 may allow the system to generate recommendations across different devices. In some embodiments, API layer 450 may be implemented on mobile device 422 or user terminal 424. Alternatively or additionally, API layer 450 may reside on one or more of cloud components 410. API layer 450 (which may be a REST or Web services API layer) may provide a decoupled interface to data and/or functionality of one or more applications. API layer 450 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PUP, and JavaScript. SOAP Web services have traditionally been adopted in the enterprise for publishing internal services, as well as for exchanging information with partners in B2B transactions.

API layer 450 may use various architectural arrangements. For example, system 300 may be partially based on API layer 450, such that there is strong adoption of SOAP and RESTful Web services, using resources like Service Repository and Developer Portal, but with low governance, standardization, and separation of concerns. Alternatively, system 300 may be fully based on API layer 450, such that separation of concerns between layers like API layer 450, services, and applications are in place.

In some embodiments, the system architecture may use a microservice approach. Such systems may use two types of layers: Front-End Layer and Back-End Layer, where microservices reside. In this kind of architecture, the role of the API layer 450 may provide integration between Front-End and Back-End. In such cases, API layer 450 may use RESTful APIs (exposition to front-end or even communication between microservices). API layer 450 may use AMQP (e.g., Katka. RabbitMQ, etc.). API layer 450 may use incipient usage of new communications protocols such as gRPC, Thrift, etc.

In some embodiments, the system architecture may use an open API approach. In such cases, API layer 450 may use commercial or open-source API platforms and their modules. API layer 450 may use a developer portal. API layer 450 may use strong security constraints applying WAF and DDoS protection, and API layer 450 may use RESTful APIs as standard for external integration.

Figure 5:
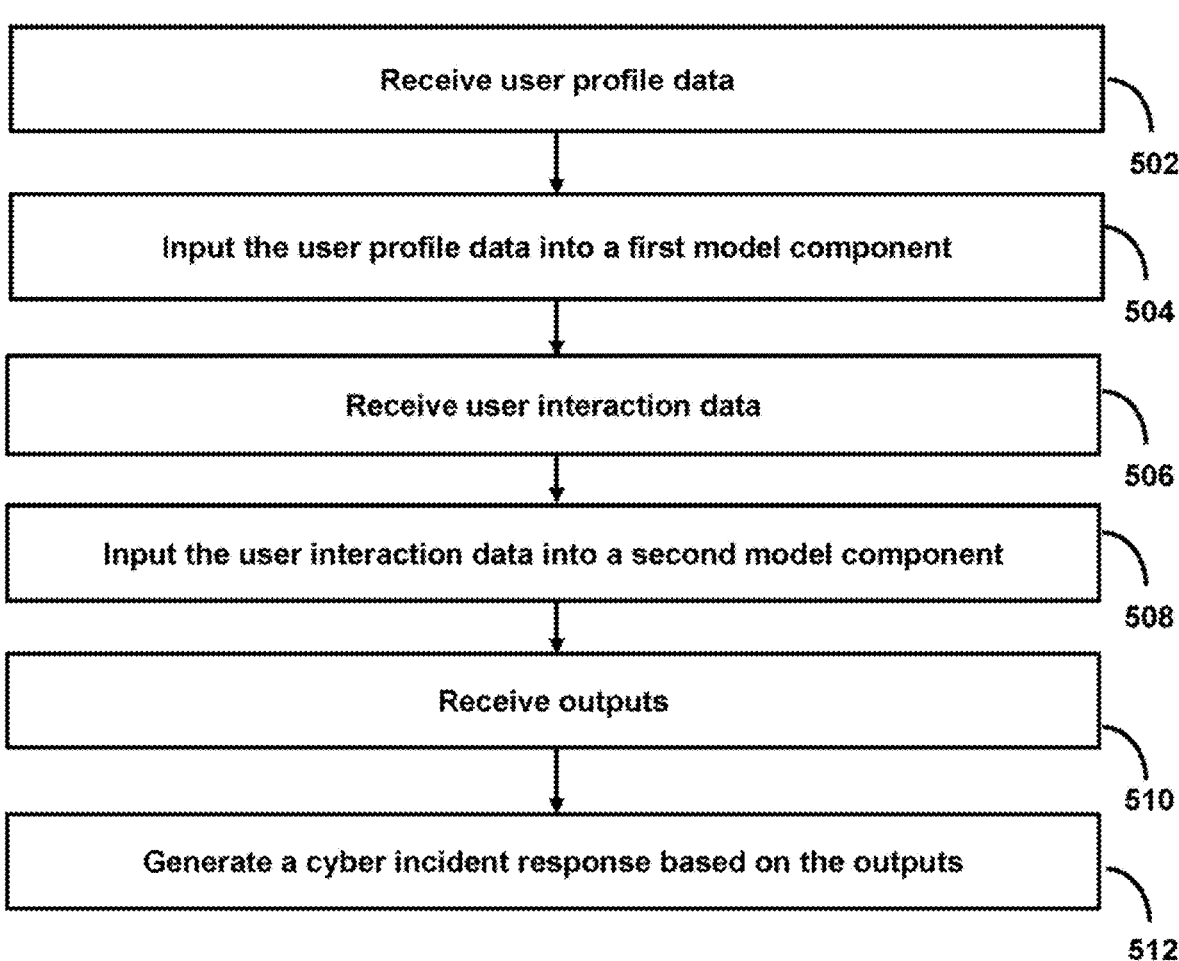
FIG. 5 shows a flowchart of the steps involved in cyber threat detection using artificial intelligence models in data-sparse environments, in accordance with one or more embodiments.

FIG. 5 shows a flowchart of the steps involved in cyber threat detection using artificial intelligence models in data-sparse environments, in accordance with one or more embodiments. For example, process 500 may represent the steps taken by one or more devices as shown in FIGS. 1-4.

At step 502, process 500 (e.g., using one or more components in system 400 (FIG. 4)) receives user profile data. For example, the system may receive user profile data, wherein the user profile data comprises content generated by the user and a user characteristic for the user. The system may then generate a feature input for the artificial intelligence model. For example, the system may generate, based on the user profile data, a first feature input.

In some embodiments, generating the first feature input may further comprise parsing and/or analyzing the content. For example, the system may determine a content characteristic for the content generated by the user. The system may then determine a content map for the content generated by the user. For example, by determining the content map for the content, the system may better determine the relationships (e.g., meaning or words) within the content. The feature input may then comprise a vector array of values indicative of the content map and the content characteristic.

At step 504, process 500 (e.g., using one or more components in system 400 (FIG. 4)) inputs the user profile data into a first model component. For example, the system may input the first feature input into a first model component of an artificial intelligence model, wherein the first model component comprises a neural network that is trained to predict a plurality of user intents based on the user characteristic, and a respective probability for each of the plurality of user intents based on a semantic analysis of the content. In some embodiments, the first model component may be trained on top of pre-trained word vectors for sentence-level classification tasks.

At step 506, process 500 (e.g., using one or more components in system 400 (FIG. 4)) receives user interaction data. For example, the system may receive user interaction data, wherein the user interaction data comprises time series data indicating an interaction rate of the user with a user device as a function of time. The system may then generate a feature input of the artificial intelligence model. For example, the system may generate, based on the user interaction data, a second feature input.

In some embodiments, the system may determine the interaction rate of a user. For example, the system may determine a first number of user interactions over a first time period. The system may then determine a second number of user interactions over a second time period. The system may then determine the interaction rate based on the first number and the second number.

At step 508, process 500 (e.g., using one or more components in system 400 (FIG. 4)) inputs the user interaction data into a second model component. For example, the system may input the second feature input into a second model component of the artificial intelligence model, wherein the second model component comprises a machine learning model that is trained to generate user engagement metrics for users based on interaction rates of users.

At step 510, process 500 (e.g., using one or more components in system 400 (FIG. 4)) receives outputs. For example, the system may receive a first output from first model component.

The system may also receive a second output from second model component. In some embodiments, the first output may comprise a multi-class classification for the plurality of user intents, and wherein the respective probability for each of the plurality of user intents based on a semantic analysis of the content comprises a probability value between 0 and 1. For example, the system may receive training data, wherein the training data comprises user characteristics labeled with corresponding use intents. The system may then train the first model component based on the training data.

At step 512, process 500 (e.g., using one or more components in system 400 (FIG. 4)) generates a cyber incident response based on the outputs. For example, the system may generate for display, in a user interface, a cyber incident response based on the first output and the second output. In some embodiments, the system may determine a probability that a user may commit a cyber incident and generate a response based on the probability. For example, the system may determine a cyber incident probability based on the first output and the second output. The system may compare the cyber incident probability to a threshold cyber incident probability. The system may, in response to comparing the cyber incident probability to a threshold cyber incident probability, determine that the cyber incident probability corresponds to the threshold cyber incident probability. The system may, in response to determining that the cyber incident probability corresponds to the threshold cyber incident probability, determine to generate for display the cyber incident response. In contrast, the system may, in response to determining that the cyber incident probability does not correspond to the threshold cyber incident probability, determine not to generate for display the cyber incident response.

In some embodiments, the system may also determine a type of cyber incident and may generate a response based on the type. For example, the system may input the first output and the second output into a third model component, wherein the third model component is trained to determine types of cyber incidents. The system may receive a third output from the third model component. The system may determine a type of cyber incident based on the third output. The system may select the cyber incident response from a plurality of cyber incident responses based on the type.

The system may use a third model component to select a cyber incident response. For example, the system may input the first output and the second output into a third model component, wherein the third model component is trained to determine types of cyber incidents. The system may receive a third output from the third model component. The system may determine a type of cyber incident based on the third output. The system may select the cyber incident response from a plurality of cyber incident responses based on the type. In some embodiments, the third model component may comprise an ensemble model and/or multi-modal stacking. For example, the system may input the second output into a third model component to generate a third output, wherein the third model component comprises multi-modal stacking. The system may select the cyber incident response from a plurality of cyber incident responses based on the third output.

Additionally or alternatively, the system may input the first output and the second output into a third model component, wherein the third model component is trained to determine weighted averages for inputs. The system may then determine a third output based on a weighted average of the first output and the second output.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag, or increase the speed of the system or method. Furthermore, it should be noted that any of the devices or equipment discussed in relation to FIGS. 1-4 could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flow-charts or examples relating to one embodiment may be combined with any other embodiment in a suitable manner, done in different orders, or done in parallel. In addition, the systems and methods described herein may be performed in real-time. It should also be noted that the systems and/or methods described above may be applied to, or used in accordance with, other systems and/or methods.

The present techniques will be better understood with reference to the following enumerated embodiments:

1. A method, the method comprising: receiving user profile data, wherein the user profile data comprises content generated by the user and a user characteristic for the user; generating, based on the user profile data, a first feature input; inputting the first feature input into a first model component of an artificial intelligence model, wherein the first model component comprises a neural network that is trained to predict a plurality of user intents based on the user characteristic, and a respective probability for each of the plurality of user intents based on a semantic analysis of the content; receiving user interaction data, wherein the user interaction data comprises time series data indicating an interaction rate of the user with a user device as a function of time; generating, based on the user interaction data, a second feature input; inputting the second feature input into a second model component of the artificial intelligence model, wherein the second model component comprises a machine learning model that is trained to generate user engagement metrics for users based on interaction rates of users; receiving a first output from first model component; receiving a second output from second model component; and generating for display, in a user interface, a cyber incident response based on the first output and the second output.

2. The method of the preceding embodiment, wherein the method is for generating cyber incident responses or cyber threat detection using artificial intelligence models in data-sparse environments.

3. The method of any one of the preceding embodiments, wherein generating the first feature input further comprising: determining a content characteristic for the content generated by the user; and determining a content map for the content generated by the user, wherein the feature input comprises a vector array of values indicative of the content map and the content characteristic.

4. The method of any one of the preceding embodiments, further comprising: determining a first number of user interactions over a first time period; determining a second number of user interactions over a second time period; and determining the interaction rate based on the first number and the second number.

5. The method of any one of the preceding embodiments, wherein generating for display the cyber incident response based on the first output and the second output further comprises: determining a cyber incident probability based on the first output and the second output; comparing the cyber incident probability to a threshold cyber incident probability; in response to comparing the cyber incident probability to a threshold cyber incident probability, determining that the cyber incident probability corresponds to the threshold cyber incident probability; and in response to determining that the cyber incident probability corresponds to the threshold cyber incident probability, determining to generate for display the cyber incident response.

6. The method of any one of the preceding embodiments, wherein generating for display the cyber incident response based on the first output and the second output further comprises: inputting the first output and the second output into a third model component, wherein the third model component is trained to determine types of cyber incidents; receiving a third output from the third model component; determining a type of cyber incident based on the third output; and selecting the cyber incident response from a plurality of cyber incident responses based on the type.

7. The method of any one of the preceding embodiments, wherein generating for display the cyber incident response based on the first output and the second output further comprises: inputting the second output into a third model component to generate a third output, wherein the third model component comprises multi-modal stacking; and selecting the cyber incident response from a plurality of cyber incident responses based on the third output.

8. The method of any one of the preceding embodiments, wherein generating for display the cyber incident response based on the first output and the second output further comprises: inputting the first output and the second output into a third model component, wherein the third model component is trained to determine weighted averages for inputs; determining a third output based on a weighted average of the first output and the second output; and selecting the cyber incident response from a plurality of cyber incident responses based on the third output.

9. The method of any one of the preceding embodiments, wherein the first model component is trained on top of pre-trained word vectors for sentence-level classification tasks.

10. The method of any one of the preceding embodiments, further comprising: receiving training data, wherein the training data comprises user characteristics labeled with corresponding use intents; and training the first model component based on the training data.

11. The method of any one of the preceding embodiments, wherein the first output comprises a multi-class classification for the plurality of user intents, and wherein the respective probability for each of the plurality of user intents based on a semantic analysis of the content comprises a probability value between 0 and 1.

12. A tangible, non-transitory, machine-readable medium storing instructions that, when executed by a data processing apparatus, cause the data processing apparatus to perform operations comprising those of any of embodiments 1-11.

13. A system comprising: one or more processors; and memory storing instructions that, when executed by the processors, cause the processors to effectuate operations comprising those of any of embodiments 1-11.

14. A system comprising means for performing any of embodiments 1-11.

What is claimed is:

1. A system for generating cyber incident responses using artificial intelligence models in data-sparse environments, the system comprising:

one or more processors; and a non-transitory, computer-readable medium comprising instructions that, when executed by the one or more processors, cause operations comprising:

receiving user profile data, wherein the user profile data comprises electronically transmitted content that is generated by a user and a user characteristic for the user, and wherein the user characteristic comprises demographic information about the user;

generating, based on the user profile data, a first feature input;

inputting the first feature input into a first model component of an artificial intelligence model to generate a first output, wherein the first model component comprises a neural network that is trained to predict a plurality of user intents based on the user characteristic, and a respective probability for each of the plurality of user intents based on a semantic analysis;

receiving user interaction data, wherein the user interaction data comprises time series data indicating an interaction rate of the user with a user device as a function of time;

generating, based on the user interaction data, a second feature input;

inputting the second feature input into a second model component of the artificial intelligence model to generate a second output, wherein the second model component comprises a machine learning model that is trained to generate user engagement metrics for users based on interaction rates of users; and determining a cyber incident probability based on the first output and the second output.

2. A method for generating incident responses using artificial intelligence models in data-sparse environments, the method comprising:

receiving user profile data, wherein the user profile data comprises content generated by a user and a user characteristic for the user;

inputting the user profile data into a first model component of an artificial intelligence model to generate a first output, wherein the first model component comprises a neural network that is trained to predict a plurality of user intents based on the user characteristic, and a respective probability for each of the plurality of user intents based on a semantic analysis of the content;

receiving user interaction data, wherein the user interaction data comprises time series data indicating an interaction rate of the user with a user device as a function of time;

inputting the user interaction data into a second model component of the artificial intelligence model to generate a second output, wherein the second model component comprises a machine learning model that is trained to generate user engagement metrics for users based on interaction rates of users; and generating for display, in a user interface, an incident response based on the first output and the second output.

3. The method of claim 2, further comprising:

determining a content characteristic for the content generated by the user; and determining a content map for the content generated by the user comprising a vector array of values indicative of the content map and the content characteristic.

4. The method of claim 2, further comprising:

determining a first number of user interactions over a first time period;

determining a second number of user interactions over a second time period; and determining the interaction rate based on the first number and the second number.

5. The method of claim 2, wherein generating for display the incident response based on the first output and the second output further comprises:

determining an incident probability based on the first output and the second output;

comparing the incident probability to a threshold incident probability;

in response to comparing the incident probability to the threshold incident probability, determining that the incident probability corresponds to the threshold incident probability; and in response to determining that the incident probability corresponds to the threshold incident probability, determining to generate for display the incident response.

6. The method of claim 2, wherein generating for display the incident response based on the first output and the second output further comprises:

inputting the first output and the second output into a third model component, wherein the third model component is trained to determine types of incidents;

receiving a third output from the third model component;

determining a type of incident based on the third output; and selecting the incident response from a plurality of incident responses based on the type.

7. The method of claim 2, wherein generating for display the incident response based on the first output and the second output further comprises:

inputting the second output into a third model component to generate a third output, wherein the third model component comprises multi-modal stacking; and selecting the incident response from a plurality of incident responses based on the third output.

8. The method of claim 2, wherein generating for display the incident response based on the first output and the second output further comprises:

inputting the first output and the second output into a third model component, wherein the third model component is trained to determine weighted averages for inputs;

determining a third output based on a weighted average of the first output and the second output; and selecting the incident response from a plurality of incident responses based on the third output.

9. The method of claim 2, wherein the first model component is trained on top of pre-trained word vectors for sentence-level classification tasks.

10. The method of claim 2, further comprising:

receiving training data, wherein the training data comprises user characteristics labeled with corresponding use intents; and training the first model component based on the training data.

11. The method of claim 2, wherein the first output comprises a multi-class classification for the plurality of user intents, and wherein the respective probability for each of the plurality of user intents based on the semantic analysis of the content comprises a probability value between 0 and 1.

12. A non-transitory, computer-readable medium comprising instructions that, when executed by one or more processors, cause operations comprising:

receiving user profile data, wherein the user profile data comprises content generated by a user and a user characteristic for the user;

inputting the user profile data into a first model component of an artificial intelligence model to generate a first output, wherein the first model component comprises a neural network that is trained to predict a plurality of user intents based on the user characteristic, and a respective probability for each of the plurality of user intents based on a semantic analysis of the content;

receiving user interaction data, wherein the user interaction data comprises time series data indicating an interaction rate of the user with a user device as a function of time;

inputting the user interaction data into a second model component of the artificial intelligence model to generate a second output, wherein the second model component comprises a machine learning model that is trained to generate user engagement metrics for users based on interaction rates of users; and generating for display, in a user interface, a response based on the first output and the second output.

13. The non-transitory, computer-readable medium of claim 12, further comprising:

determining a content characteristic for the content generated by the user; and determining a content map for the content generated by the user comprising a vector array of values indicative of the content map and the content characteristic.

14. The non-transitory, computer-readable medium of claim 12, wherein the instructions further cause operations comprising:

determining a first number of user interactions over a first time period;

determining a second number of user interactions over a second time period; and determining the interaction rate based on the first number and the second number.

15. The non-transitory, computer-readable medium of claim 12, wherein generating for display the response based on the first output and the second output further comprises:

determining a probability based on the first output and the second output;

comparing the probability to a threshold probability;

in response to comparing the probability to the threshold probability, determining that the probability corresponds to the threshold probability; and in response to determining that the probability corresponds to the threshold probability, determining to generate for display the response.

16. The non-transitory, computer-readable medium of claim 12, wherein generating for display the response based on the first output and the second output further comprises:

inputting the first output and the second output into a third model component, wherein the third model component is trained to determine types of incidents;

receiving a third output from the third model component;

determining a type of incident based on the third output; and selecting the response from a plurality of responses based on the type.

17. The non-transitory, computer-readable medium of claim 12, wherein generating for display the response based on the first output and the second output further comprises:

inputting the second output into a third model component to generate a third output, wherein the third model component comprises multi-modal stacking; and selecting the response from a plurality of responses based on the third output.

18. The non-transitory, computer-readable medium of claim 12, wherein generating for display the response based on the first output and the second output further comprises:

inputting the first output and the second output into a third model component, wherein the third model component is trained to determine weighted averages for inputs;

determining a third output based on a weighted average of the first output and the second output; and selecting the response from a plurality of responses based on the third output.

19. The non-transitory, computer-readable medium of claim 12, wherein the first model component is trained on top of pre-trained word vectors for sentence-level classification tasks.

20. The non-transitory, computer-readable medium of claim 12, wherein the instructions further cause operations comprising:

receiving training data, wherein the training data comprises user characteristics labeled with corresponding use intents; and training the first model component based on the training data.

* * * * *